United States Patent
Ferraby et al.

(10) Patent No.: US 8,220,730 B2
(45) Date of Patent: Jul. 17, 2012

(54) INTERLOCK SYSTEM

(75) Inventors: Robin Ferraby, Havant (GB); Christina Goodrick-Meech, Southsea (GB); Johan Santer, Havant (GB)

(73) Assignee: Kenwood Limited, Hampshire (GB)

( * ) Notice: Subject to any disclaimer, the term of this patent is extended or adjusted under 35 U.S.C. 154(b) by 546 days.

(21) Appl. No.: 11/916,302

(22) PCT Filed: May 10, 2006

(86) PCT No.: PCT/GB2006/001731
§ 371 (c)(1),
(2), (4) Date: Apr. 20, 2010

(87) PCT Pub. No.: WO2006/129051
PCT Pub. Date: Dec. 7, 2006

(65) Prior Publication Data
US 2010/0206701 A1    Aug. 19, 2010

(30) Foreign Application Priority Data
Jun. 3, 2005   (GB) ................................. 0511286.7

(51) Int. Cl.
*B02C 25/00* (2006.01)
*H01H 27/00* (2006.01)
(52) U.S. Cl. .................... 241/37.5; 200/43.04; 200/334; 200/331
(58) Field of Classification Search ............... 200/52 R, 200/334, 43.01–43.04, 43.16, 43.18, 47, 200/50.01, 50.02, 50.1, 61.58 R, 61.59, 61.62, 200/61.64, 61.66, 61.76, 526, 528, 529, 533, 200/538, 534, 542, 573, 574, 323–325, 330, 200/331; 241/33, 36, 37, 37.5; 99/337, 492, 99/510; 366/206
See application file for complete search history.

(56) References Cited

U.S. PATENT DOCUMENTS

| 4,216,917 | A | * | 8/1980 | Clare et al. ................... 241/37.5 |
| 4,695,684 | A | * | 9/1987 | Bochard et al. ............ 200/43.07 |
| 5,626,223 | A | * | 5/1997 | Lee ............................... 200/529 |
| 5,861,591 | A | * | 1/1999 | Wegener et al. ........... 200/50.32 |
| 5,979,806 | A |   | 11/1999 | Borger |
| 6,112,649 | A |   | 9/2000 | Jeong |

(Continued)

OTHER PUBLICATIONS

International Search Report published Dec. 7, 2006 for PCT/GB06/01731 filed May 10, 2006.

(Continued)

*Primary Examiner* — Michael Friedhofer
(74) *Attorney, Agent, or Firm* — Martin Fleit; Paul D. Bianco; Fleit Gibbons Gutman Bongini & Bianco PL

(57) ABSTRACT

An interlock system for actuating a switch to interrupt a flow of electrical current to a component of a domestic electrical appliance is described. The current is interrupted unless a sensor indicates that the appliance is in a safe condition, and the system includes a rod-like member which is turned about its own axis through at least a predetermined angle, when the appliance is safe, to actuate the switch to permit current to flow. The safe condition is typified by the secure placement of a lid or cover on a receptacle in a manner intended for operation of the appliance. Moreover, the lid or cover for the receptacle may be formed with an upstanding, chimney-like feed-tube through which food items can be added for processing in the receptacle, and a "pusher" device, sized to fit closely within the feed tube, is further provided, by means of which a user can urge foodstuffs into the receptacle for processing. In such circumstances, and where a feed-tube is of relatively wide dimensions is employed to enable relatively bulky food items to be added to the receptacle, the system senses not only that the lid or cover is in place, but also that a pusher device has been inserted into the feed-tube, before the switch can be actuated.

8 Claims, 2 Drawing Sheets

U.S. PATENT DOCUMENTS

| | | | | |
|---|---|---|---|---|
| 6,637,681 B1 * | 10/2003 | Planca et al. | .................. | 241/37.5 |
| 6,669,124 B2 * | 12/2003 | Lazzer et al. | ................... | 241/36 |
| 6,768,073 B1 * | 7/2004 | Tondra et al. | ............. | 200/332.2 |
| 6,907,819 B2 * | 6/2005 | Kernan | ........................... | 99/492 |
| 6,986,475 B2 * | 1/2006 | Wanat | .......................... | 241/37.5 |
| 7,069,839 B2 * | 7/2006 | Kernan | ........................... | 99/337 |

OTHER PUBLICATIONS

Written Opinion published Dec. 23, 2007 for PCT/GB06/01731 filed May 10, 2006.

International Preliminary Report on Patentability published Dec. 23, 2007 for PCT/GB06/01731 filed May 10, 2006.

* cited by examiner

INTERLOCK SYSTEM

CROSS-REFERENCE TO RELATED APPLICATIONS

This is a National Stage Application of International Patent Application No. PCT/GB2006/001731, with an international filing date of May 10, 2006, which is based on United Kingdom Patent Application No. 0511286.7, filed Jun. 3, 2005. The contents of the aforementioned applications are incorporated herein by reference.

BACKGROUND OF THE INVENTION

1. Field of the Invention

This invention relates to interlock systems, and it relates especially, though not exclusively, to such systems as are intended for use as safety measures in domestic electrical appliances, such as food processors, food mixers, blenders and the like; in general any appliance that has moving parts and/or heating elements that could, under certain operational circumstances, cause harm to a user in the absence of the interlock system. The invention also encompasses a domestic electrical appliance incorporating such an interlock system.

2. Description of the Related Art

Interlock systems are an essential feature of many domestic appliances, and their components need to satisfy demanding, and sometimes opposing, operational, regulatory, economic and aesthetic criteria. Hence difficulties arise in providing interlock systems that are sufficiently robust and reliable to meet user demands and comply with stringent regulatory stipulations, whilst being economical to produce and conforming to an acceptable aesthetic design.

Many interlock systems have been devised hitherto for sensing when safe and unsafe conditions obtain in domestic electrical food preparation equipment and the like. A typical condition required to be sensed with such equipment is the presence or absence of a lid or cover on a receptacle within which a processing tool is to be rotated or otherwise moved by means of an electric motor. Typically, such tools are driven at relatively high speeds and contain sharply edged blades or rasp-like features which are intended to cut, mash or otherwise comminute food items placed in the receptacle for processing. Accordingly, dangerous situations can arise if such tools are operated whilst the receptacle is open, and thus it is standard practice to provide the lid or cover with some kind of actuator which operates, directly or indirectly, on an interlock switch means, such that the supply of electrical current to the motor is interrupted unless the lid or cover is securely in place upon the receptacle.

It will be appreciated that, where the aforementioned actuator associated with the lid or cover operates directly upon the interlock switch means, it is necessary either to dispose the switch means near the lid or cover or to have the actuator carry a significant extension piece that can reach a more remotely-located switch means. For various reasons, neither configuration is particularly attractive for practical use, and thus the majority of equipment utilizes indirect operation.

Indirect operation implies that the actuator associated with the lid or cover operates an intermediate member which then, in turn, operates the switch means. Again, many different types of intermediate member have been tried, such as levers, push-rods and the like; though difficulties remain in providing a system which can accurately and reliably convey the status of the actuator to the switch means by way of a mechanism which is rugged, reliable, cost-effective, resistive to (or insensitive to) the ingress of food or other products processed by the equipment, aesthetically acceptable and which cannot readily be compromised (accidentally or deliberately) by users.

Typically, the lid or cover for the receptacle is formed with an upstanding, chimney-like feed-tube through which food items can be added for processing in the receptacle. A "pusher", typically of plastics material and sized to fit closely within the feed tube, is further provided, by means of which a user can urge foodstuffs down into the receptacle for processing. Such feed tubes provide direct access to the interior of the receptacle and thus, in principle, can compromise operational safety. Many such tubes, however, are dimensionally con-Fig.d to be relatively narrow in breadth and relatively tall in height, so that any such compromise is minimal.

There is, however, a demand for food preparation equipment provided with a wide feed-tube and associated pusher, to enable relatively bulky food items to be added to the receptacle for processing. Such equipment presents special difficulties as regards the interlock requirements, since there is now a need to detect not only that the lid or cover is in place, but also that a pusher has been inserted into the feed tube, before the motor can be driven. Thus, a dual interlock system is required.

U.S. Pat. No. 4,216,917 describes a dual interlock system, in which a wide feed tube is made safe by virtue of an interlock which recognizes the presence of a pusher in the feed tube. The prior art system provides a vertical rib on the side of the pusher, which enters a corresponding vertical channel extending down the side of the feed-tube and actuates a spring-loaded operator member, extending it downwards. This in turn acts on a cam member which bears down on a main interlock rod, extending down the side of the receptacle, which actuates a cut-out switch.

The prior art system is quite complex and it is desirable, from the standpoints of both economy and reliability, to provide an improved system.

BRIEF DESCRIPTION OF THE INVENTION

Accordingly, the invention provides an interlock system for a domestic electrical appliance provided with a receptacle containing a tool capable of being rotated by means including an electric motor of said appliance to subject ingredients in said receptacle to processing by said tool, and having a lid intended to be closed whilst said tool is rotating; the lid bearing a relatively wide feed-tube to enable relatively bulky ingredients to be added to the receptacle for processing; and a pusher device for insertion into the feed-tube to urge said ingredients toward said tool; the interlock system including: a switch means, normally configured to interrupt a supply of operative electrical current to said motor, and actuator means to operate said switch means to connect said electrical current supply to said motor only when the lid is closed and the pusher device is installed into the feed-tube; the actuator means comprising: an engagement member, carried by the pusher device and movable relative to an external edge of said feed-tube when said pusher device is inserted into said feed-tube, and an operator member housed at said external edge of the feed-tube, extending generally axially there-along, and located such that the engagement member approaches a part of the operator member when the pusher device is located in the mouth of the feed-tube; the interlock system being characterized by: the operator member comprising a rod-like member; the engagement member and said part of the rod-like member supporting component surfaces configured for inter-engagement whereby, as the pusher device is pressed further into the feed-tube, the inter-engagement of said component surfaces causes the rod-like member to rotate, against resistance, about its own axis; and by the provision of further means, responsive to said rod-like member turning through at least a predetermined angle, for actuating said switch means to then connect said electrical current supply to said motor.

In one preferred embodiment, the said further means for actuating said switch means comprises a further rod-like member disposed along a wall of said receptacle, with one end located adjacent a rim of said receptacle, and wherein said one end of said further rod-like member is disposed within a shroud supported on said rim.

In one preferred arrangement of such a system, the shroud on the receptacle is provided with two entry slots; one to accept a flange on a lid for said receptacle carrying a relatively narrow feed-tube, and the other to accept an operating member urged into it by rotation, through said predetermined angle, of the first-mentioned rod-like member.

In an alternative preferred arrangement of such a system, the shroud on the receptacle is provided with a single entry slot accessible both to a flange on a lid or cover carrying a relatively narrow feed-tube and to an operating member urged into it by rotation, through said predetermined angle, of the first-mentioned rod-like member.

Further preferably, a flange carried by the lid is used to prime the further rod-like member for actuation by the first-mentioned rod-like member when the pusher device is introduced into the feed-tube.

Still further, it is preferred that a flange carried by the lid bearing a wide feed-tube is shaped and conFig.d to operate upon the shroud, thereby to open a window or cover over a slot for entry of the actuator attached to the first-mentioned rod-like member.

In any of the foregoing systems, it is preferred that said component surfaces conFig.d for inter-engagement comprise a cam member, carried by said first-mentioned rod-like member, responsive to sliding contact with the component surface of said engagement member to rotate said first-mentioned rod-like member.

In systems utilizing said first-mentioned and further rod-like members, it is preferred in some embodiments that adjacent ends of said rod-like members carry respective gear wheels, whereby rotation of said first-mentioned rod-like member is imposed, via meshing of the gear wheels, upon the further rod-like member.

BRIEF DESCRIPTION OF THE DRAWINGS

In order that the invention may be clearly understood and readily carried into effect, certain embodiments thereof will now be described with reference to the accompanying drawings, of which.

DETAILED DESCRIPTION OF THE INVENTION

Typically, prior art interlock systems capable of preventing operation of a domestic food mixing or processing appliance until a lid or cover has been properly located on an otherwise open receptacle in which a processing tool is driven to process foodstuffs, use a push-rod which runs down a side-wall of the receptacle. Usually the upper end of the push-rod is disposed within a shrouded location atop the side-wall, and its lower end protrudes through a small aperture into a base casing which supports the receptacle in use and which also houses a drive motor for the appliance. In such systems, a normally open cut-off switch, or an actuator for such a switch, is also disposed within the housing and close to the aperture. The rod is spring-loaded away from the cut-off switch or its actuator. In use, when the lid or cover is rotated to set it in its correct operative position upon the receptacle, an actuator formed on the rim of the lid or cover enters (through a suitably located slot) the shroud that covers the upper end of the rod and engages the upper end of the rod with a camming action, so as to force it downwards, against the spring pressure, such that the lower end of the rod impacts the cut-off switch or its actuator, thereby closing the switch and permitting electrical current to flow to the motor.

This is an effective and reliable interlock system, and the embodiment of the invention now to be described utilizes such a system as one component of a dual interlock system.

Figure 1:
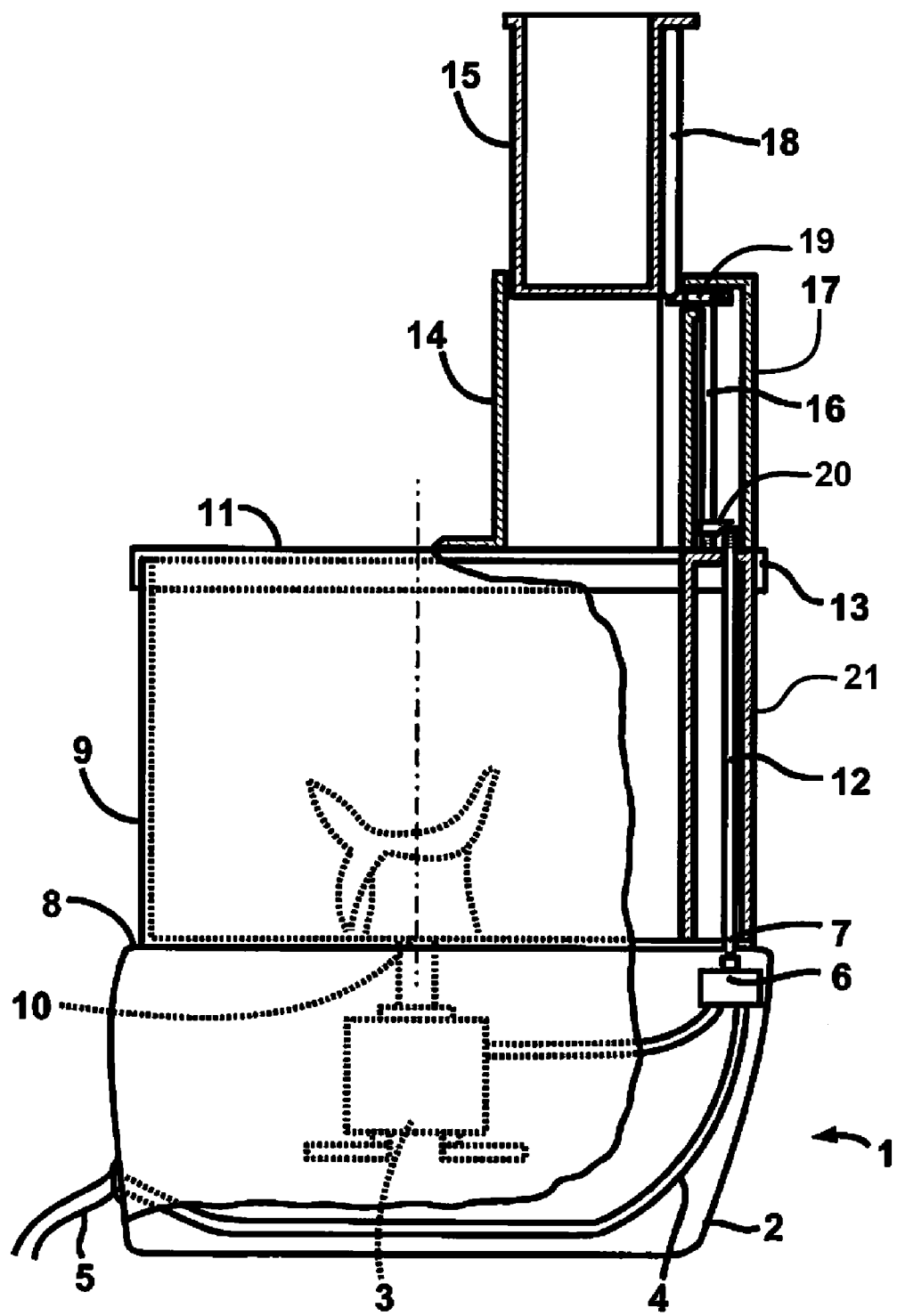
FIG. 1 shows, in side elevation and in part cross-sectional view, a food processor in accordance with one example of the invention.
Figure 2A:
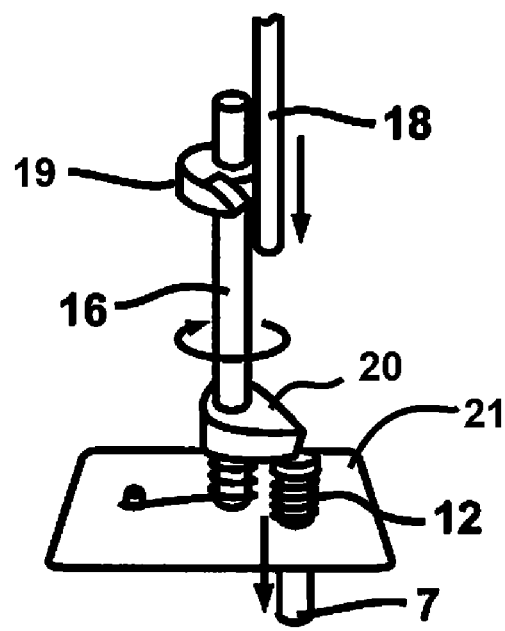
FIG. 2(a) shows, in schematic and perspective view, certain operational elements of a system, in accordance with one example of the invention, that is usable with the food processor of FIG. 1.

Accordingly, and with reference to FIGS. 1 and 2(a), a first embodiment of the invention comprises a dual interlock system in which a domestic electrical appliance 1, in this example, a food processor, comprises a base casing 2 which houses an electric motor 3 and various electrical connections thereto including an energizing connection 4, which may (depending on the type and rating of the motor 3) be connected directly to a mains lead 5 or alternatively to a source, such as a transformer, of a different voltage; the source in that case being connected to the mains lead.

The energizing connection 4 is coupled to the motor by way of a normally open cut-off switch 6 which is located, in this example, close to an aperture 7 in the upper surface 8 of the casing 2. The upper surface 8 of the casing 2 is also intended to support and locate a receptacle 9, such as a food-processing bowl, in which a mixing, cutting or other form of processing tool can be mounted for rotation by the motor 3. The upper surface 8 is further apertured at 10 to permit drive to be transmitted from the motor 3 to the tool in the bowl 9, as is well known in the art.

The bowl 9 is provided with a lid or cover 11 which needs to be properly located upon the upper rim of the bowl 9, thereby preventing a user from accessing the interior of the bowl, before the motor can be permitted to operate. Accordingly, a first interlock system is provided whereby a rod 12 is mounted for vertical movement relative to the side-wall of the bowl 9; the lower end of the rod 12 being positioned, when the bowl 9 is properly located on the upper surface 8 of the casing 2, directly above the aperture 7 in the surface 8. The upper end of the rod is shrouded, to prevent users from directly pressing it, and the rod 12 is spring-loaded to cause the upper end thereof to remain within the shroud 21 unless physically pressed downwards, against the spring pressure, as will now be described.

When the lid 11 is properly located on the upper rim of the bowl 9, a flange 13 formed on the edge of the lid 11 enters the shroud 21 and contacts the upper end of the rod 12. The inter-engaging surfaces of the flange 13 and the upper end of rod 12 are formed with respective cam profiles that are such as to cause the flange to depress the rod 12, against the aforementioned spring pressure, thus causing the lower end of the rod to enter the casing 2 via aperture 7 and to push the actuator of the cut-off switch 6, thereby closing the switch contacts and enabling the supply of electricity to the motor by way of connection 4.

The lid or cover 11, however, carries a wide feed-tube 14, and thus could compromise the safety provided by the interlock system described thus far unless further safety provision is made. In accordance with this embodiment of the invention, the further safety provision is provided by means of a second interlock system which is sensitive to the placement of a pusher device 15 of the correct dimensions within the feed-tube 14.

The dual system in this embodiment comprises a further, vertically-disposed rod 16, which is housed at an edge of the feed-tube 14; the upper end of the rod being encased within a protective housing 17 intended to prevent deliberate or accidental frustration of the dual interlock.

The upper edge of the pusher 15 (that which is pressed by the user) is formed with a downwardly-dependent prong member 18 which is shaped to engage with a cam 19 formed at the top of the rod 16; the arrangement being such that, when the pusher device 15 is located correctly in the mouth of the wide feed-tube 14, the prong 18 enters the protective housing 17 and, as the pusher device 15 is pressed further into the feed-tube, the prong 18 bears against the cam 19, causing the rod 16 to rotate about its own axis thereby to introduce a lower cam member 20 into a slot in the shroud 21 on the wall of bowl 9, thereby to depress the rod 12 in a manner analogous to that described above.

The rod 16 is spring-loaded in torsion to hold the lower cam member 20 out of contact with the rod 12 until the rod 16 has been rotated as described by interaction with the prong 18.

Thus it will be appreciated that, if a lid or cover 11 carrying a conventional, narrow feed-tube is used, the interlock system device acts conventionally by depression of the rod 12. If, on the other hand, a lid or cover carrying a wide feed-tube is employed, the interlock system requires the dual interaction of the rods 12 and 16 as described.

In an alternative arrangement, a narrow feed-tube may be provided for insertion into a wide feed-tube for use in circumstances where the wide feed-tube is not necessary.

It will be appreciated that, in the embodiment described above, the shroud on the bowl may be provided with two entry slots; one associated with a flange on a lid or cover carrying a conventional, narrow feed-tube, and the other associated with the cam that is urged into it by means of the rotating rod 16. Alternatively, the flange and the cam may both access the shroud via a common slot. Alternatively or in addition, the flange carried by the lid or cover may be used to prime the rod 12 for actuation by the rod 16 when the pusher is introduced into the aforementioned wide feed-tube. Still further, the flange carried by the lid or cover bearing a wide feed-tube might be shaped and configured to operate upon the shroud, rather than the rod 12; the arrangement being such that entry of the flange into the shroud from one direction opens a window or cover over a slot for entry of the actuator attached to rod 16 from the opposing direction.

Driving the rod 16 in rotation, rather than merely depressing it, provides considerable advantage in terms of operational reliability and simplicity of construction. Being rotated around its own axis, the rod 16 tends to self-clean the structure in which it is supported, and the degree of rotation, and hence operational freedom, is readily controllable by suitably shaping the interacting cam surfaces and/or by providing a screw-threaded bearing in which the rod can be turned.

In an alternative embodiment, the cam mechanism for driving the rod 16 in rotation may be replaced by a mechanism such as that used for retractable pen bodies, whereby a downward motion of an actuator generates a rotating motion of a tubular or rod-like member.

Figure 2B:
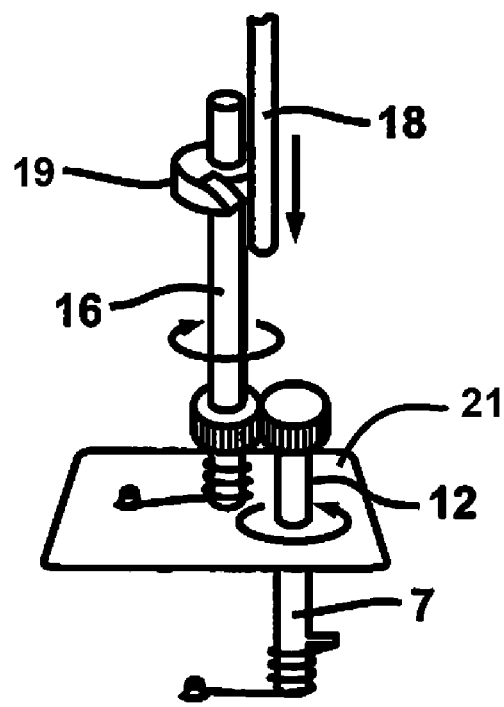
FIG. 2(b) shows, in schematic and perspective view, certain operational elements of a system, in accordance with another example of the invention, that is usable with the food processor of FIG. 1.

In further alternative embodiments, usable in both single and dual interlock systems, and as shown by way of example in FIG. 2(*b*), the rod 12 can also be configured to rotate about its own axis and thereby be actuated in any of the ways described in relation to rod 16. Moreover, in a dual system, if the rod 16 is also caused to rotate about its own axis, rather than being merely pushed, the co-operation between the rods 12 and 16 can be effected by disposing the rods directly in line with one another and having the upper rod 16 screw onto a fixing at the top of rod 12, thereby to rotate the latter for downward motion.

The invention claimed is:

1. An interlock system for a domestic electrical appliance (1) provided with a receptacle (9) comprising a tool capable of being rotated by means comprising an electric motor (3) of said appliance to subject ingredients in said receptacle to processing by said tool, and having a lid (11) intended to be closed whilst said tool is rotating; the lid bearing a relatively wide feed-tube (14) to enable relatively bulky ingredients to be added to the receptacle (9) for processing; and a pusher device (15) for insertion into the feed-tube (14) to urge said ingredients toward said tool; the interlock system comprising:

switch means (6) for interrupting a supply of operative electrical current to said motor (3), and actuator means for operating said switch means (6) to connect said electrical current supply to said motor (3) only when the lid (11) is closed and the pusher device (15) is installed into the feed-tube (14);

wherein the actuator means comprises an engagement member (15), carried by the pusher device (15) and movable relative to an external edge of said feed-tube (14) when said pusher device is inserted into said feed-tube, and an operator member housed at said external edge of the feed-tube (14), extending generally axially there-along, and located such that the engagement member (18) approaches a part of the operator member when the pusher device (15) is located in the mouth of the feed-tube (14);

the operator member comprises a first rod-like member (16); and the engagement member (18) and a part of said first rod-like member (16) supporting component surfaces (17) are configured for inter-engagement whereby, as the pusher device (15) is pressed further into the feed-tube (14), the inter-engagement of said component surfaces causes said first rod-like member (16) to rotate, against resistance, about its own axis; and by the provision of further means (12), responsive to said first rod-like member (16) turning through at least a predetermined angle, for actuating said switch means (6) to then connect said electrical current supply to said motor (3).

2. The system of claim 1 wherein said further means for actuating said switch means (6) comprises a second rod-like member (12) disposed along a wall of said receptacle (9), with one end located adjacent a rim of said receptacle, and said one end of said second rod-like member (12) is disposed within a shroud supported on said rim.

3. The system of claim 2 wherein the shroud on the receptacle (9) is provided with two entry slots; one to accept a flange on a lid for said receptacle (9) carrying a relatively narrow feed-tube, and the other to accept an operating member (20) urged into it by rotation, through said predetermined angle, of said first rod-like member (16).

4. The system of claim 2 wherein the shroud on the receptacle (9) is provided with a single entry slot accessible both to a flange on a lid or cover carrying a relatively narrow feed-tube and to an operating member (20) urged into it by rotation, through said predetermined angle, of said first rod-like member (16).

5. The system of claim 2 wherein a flange (13) carried by the lid (11) is used to prime said second rod-like member (12) for actuation by said first rod-like member (16) when the pusher device (15) is introduced into the feed-tube (14).

6. The system of claim 2 wherein a flange (13) carried by the lid (11) bearing a wide feed-tube (14) is shaped and configured to operate upon the shroud, thereby to open a window or cover over a slot for entry of the actuator (20) attached to said first rod-like member (16).

7. The system of claim 2 wherein said component surfaces configured for inter-engagement comprise a cam member (17), carried by said first rod-like member (16), and
    responsive to sliding contact with the component surface of said engagement member (18) to rotate said first rod-like member (16).

8. The system according to claim 2 wherein adjacent ends of said first rod-like members (16) and said second rod-like member (12) carry respective gear wheels, whereby rotation of said first rod-like member (16) is imposed, via meshing of the gear wheels, upon said second rod-like member (12).

\* \* \* \* \*